(12) United States Patent
Yang et al.

(10) Patent No.: US 8,256,804 B2
(45) Date of Patent: Sep. 4, 2012

(54) ELECTRONIC APPARATUS AND LATCHING DEVICE THEREOF

(75) Inventors: Xin Yang, Shenzhen (CN); Wei Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 357 days.

(21) Appl. No.: 12/621,503

(22) Filed: Nov. 19, 2009

(65) Prior Publication Data

US 2010/0253187 A1 Oct. 7, 2010

(30) Foreign Application Priority Data

Apr. 1, 2009 (CN) .................... 2009 1 0301274.3

(51) Int. Cl.
*E05C 19/10* (2006.01)
*E05C 3/02* (2006.01)

(52) U.S. Cl. ............ 292/102; 292/95; 292/98; 292/121; 292/124; 292/219; 292/194; 292/DIG. 63

(58) Field of Classification Search .................. 292/95, 292/96, 98, 99, 101, 102, 121, 122, 124, 292/128, 194, 195, 202, 216, 220, 227, 228, 292/DIG. 63

See application file for complete search history.

(56) References Cited

U.S. PATENT DOCUMENTS

| | | | | |
|---|---|---|---|---|
| 695,736 A | * | 3/1902 | Kendrick | 292/227 |
| 1,147,322 A | * | 7/1915 | Hampton | 292/220 |
| 1,556,524 A | * | 10/1925 | Kibble et al. | 292/127 |
| 3,339,956 A | * | 9/1967 | Bencene et al. | 292/127 |
| 5,823,644 A | * | 10/1998 | Suh et al. | 312/223.2 |
| 6,158,105 A | * | 12/2000 | Suh | 29/453 |
| 6,256,194 B1 | * | 7/2001 | Choi et al. | 361/679.58 |
| 6,927,972 B1 | * | 8/2005 | Wang et al. | 361/679.55 |

FOREIGN PATENT DOCUMENTS

| | | |
|---|---|---|
| CN | 2599633 | 1/2004 |
| DE | 3207718 A1 * | 9/1983 |

* cited by examiner

*Primary Examiner* — Carlos Lugo
(74) *Attorney, Agent, or Firm* — Altis Law Group, Inc.

(57) ABSTRACT

An electronic apparatus includes a first body, a second body pivotally attached on the first body for covering on the first body, and a latching device for locking the second body on the first body when the second body covers the first body. The latching device includes a locking member rotatably attached on the first body, a hook disposed on the second body and capable of hooking on the locking member for locking the second body on the first body, and a driving subassembly rotatably connecting with locking member and slidably disposed on the first body. The driving subassembly drives the locking member to rotate to engage and disengage with the hook.

10 Claims, 6 Drawing Sheets

ELECTRONIC APPARATUS AND LATCHING DEVICE THEREOF

BACKGROUND

1. Technical Field

The present disclosure relates to electronic apparatuses, and particularly to an electronic apparatus having a latching device.

2. Description of Related Art

A conventional electronic apparatus includes a main body and a cover body. The cover body is pivotably attached on the main body for folding over the main body. The cover body includes a hook, and the main body includes a locking slot. When the cover body covers on the main body, the hook of the cover body deforms in order to pass through the locking slot and hooks on the main body to secure the cover body on the main body. However, the hook is prone to damage after deforming repeatedly, therefore, the hook is not reliable after repeated use.

Therefore, it is desirable to provide an electronic apparatus with a latching device which can overcome the above-mentioned problems.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
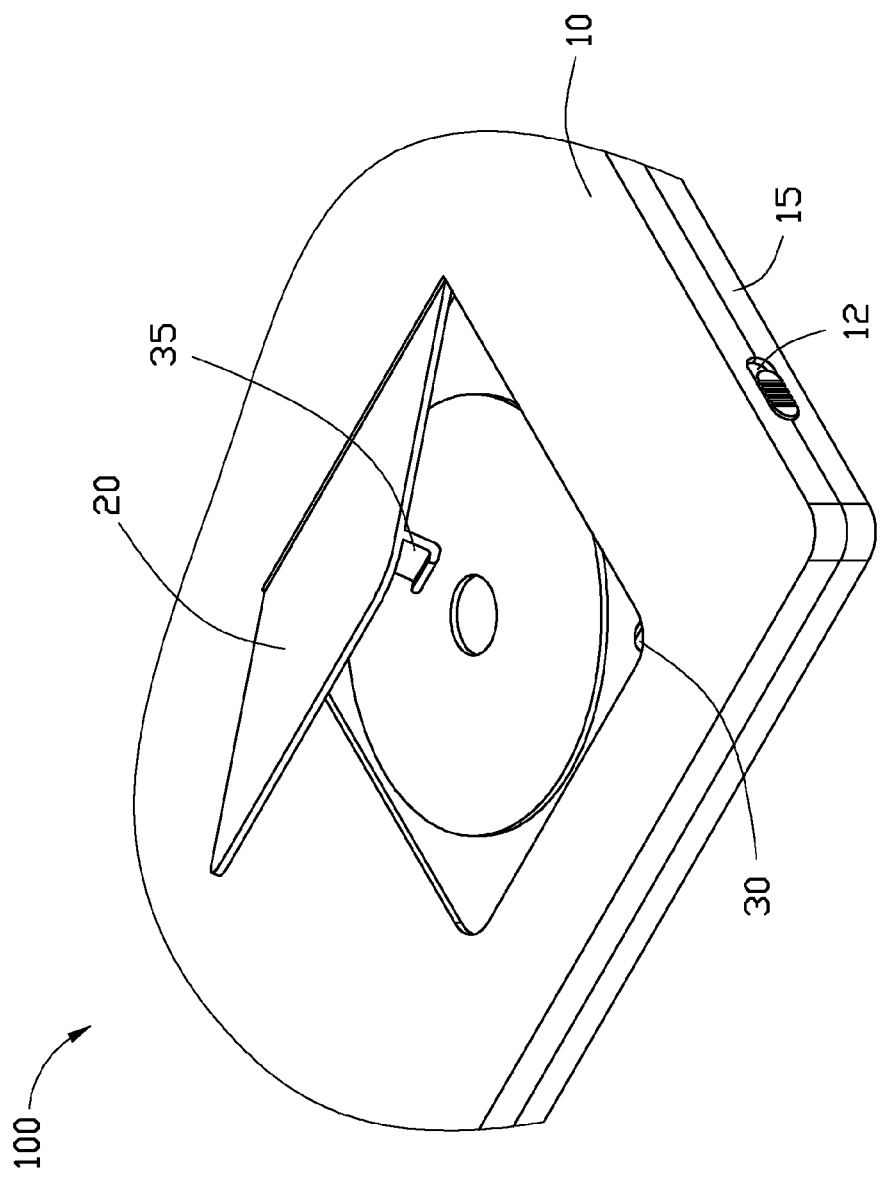
FIG. 1 is an isometric view of an electronic apparatus according to an exemplary embodiment.

Referring to FIG. 1, an electronic apparatus 100 according to an exemplary embodiment includes a first body 10, a second body 20, and a latching device 30. The second body 20 is pivotably attached on the first body 10 to foldably cover the first body 10. The latching device 30 is used for securing the second body 20 on the first body 10 when the second body 20 is folded over the first body 10.

Figure 2:
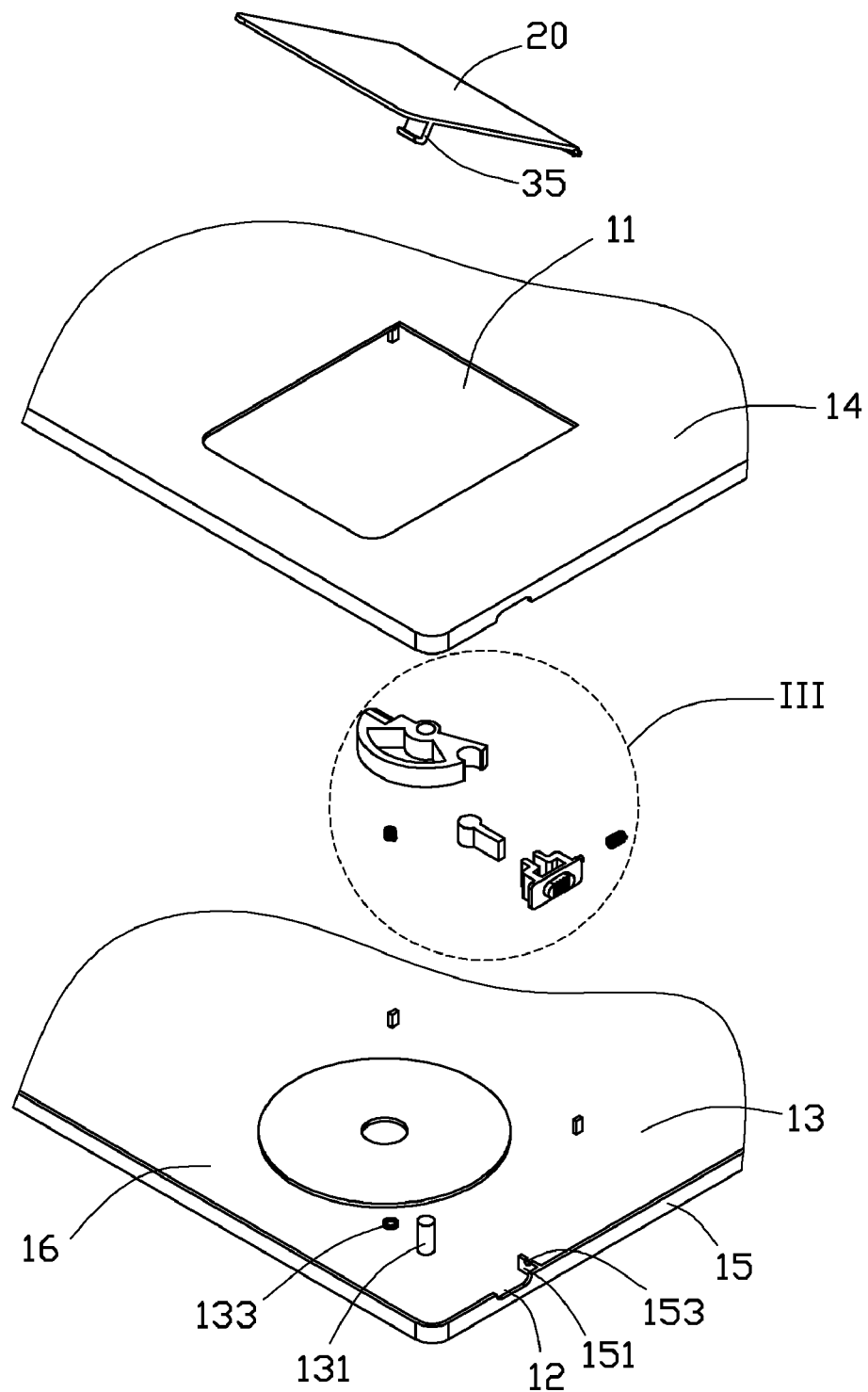
FIG. 2 is an exploded isometric view of the electronic apparatus of FIG. 1.
Figure 3:
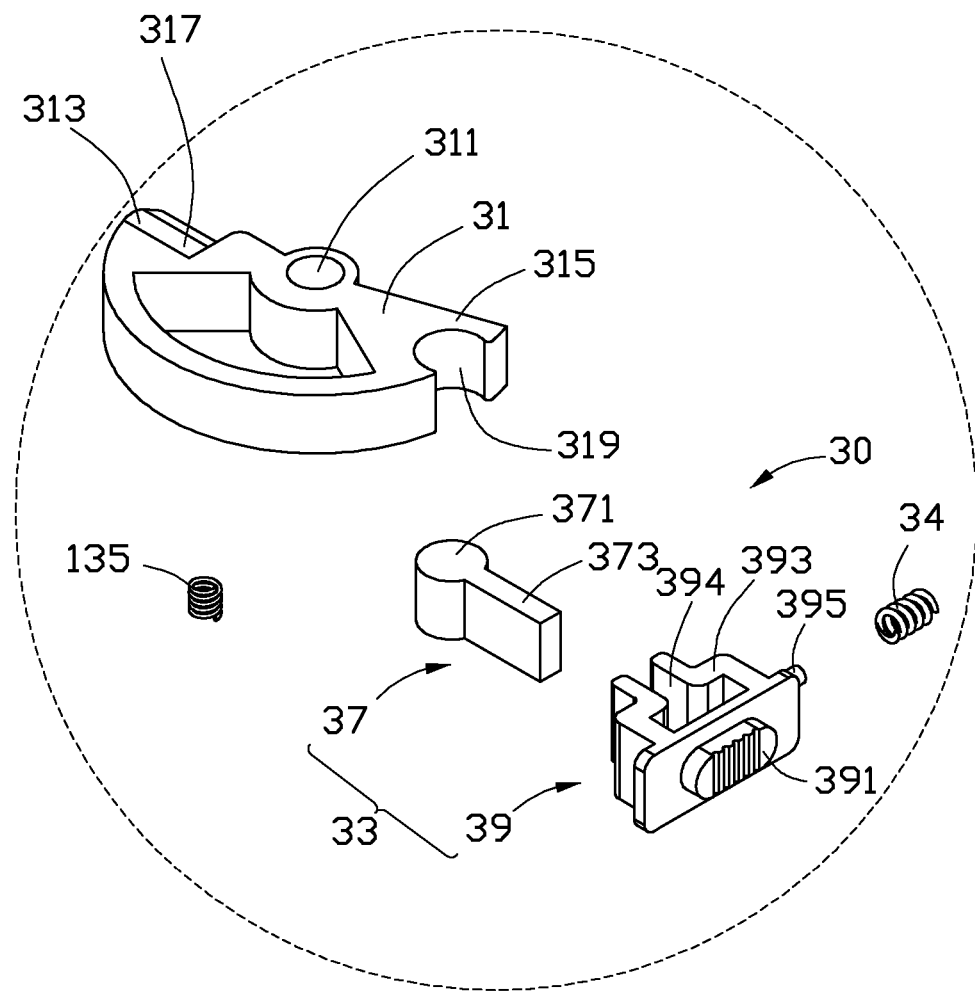
FIG. 3 is a partial enlarged view of a circled portion III of FIG. 2.

Further referring to FIGS. 2 and 3, the first body 10 includes a lower cover 13, an upper cover 14, and a side wall 15. The side wall 15 is disposed between the lower cover 13 and the upper cover 14 for connecting the lower cover 13 and the upper cover 14 to form a space 16. The upper cover 14 is located between the lower cover 13 and the second body 20, and defines an opening 11 corresponding to the second body 20. The side wall 15 defines a sliding slot 12. A limiting portion 151 perpendicularly protrudes from the side wall 15 and also perpendicularly connects with the lower cover 13. The limiting portion 151 defines a limiting hole 153.

The lower cover 13 includes a positioning post 131 and a receiving portion 133. The positioning post 131 faces the upper cover 14. The receiving portion 133 is cylindrical for receiving an elastic supporting member 135, and faces the second body 20 via the opening 11. In the embodiment, the elastic supporting member 135 is a spring.

The second body 20 is used for covering the opening 11 to protect electronic components disposed in the electronic apparatus 100 from external exposure.

The latching device 30 includes a locking member 31, a driving subassembly 33, a flexible member 34, and a hook member 35.

The locking member 31 is substantially semicircle-shaped and rotatably attached on the lower cover 13. The locking member 31 defines a positioning hole 311 to sleeve on the positioning post 131 in the center, and includes a locking portion 313 and a driven portion 315. The positioning hole 311 is located between the locking portion 313 and the driven portion 315. The locking portion 313 includes an inclined surface 317 facing the second body 20. The driven portion 315 defines an arc-shaped receiving slot 319 facing the sliding slot 12.

The driving subassembly 33 is slidably received in the sliding slot 12, and is capable of driving the locking member 31 to rotate around the positioning post 131. The driving subassembly 33 includes a transmission member 37 and an actuating member 39 engaging with the transmission member 37.

The transmission member 37 is disposed between the driven portion 315 and the actuating member 39, and engaged with the driven portion 315 and the actuating member 39. The transmission member 37 includes a driving portion 371 and a transmission portion 373 extending from the driving portion 371. The driving portion 371 is substantially a column rotatably received in the receiving slot 319.

The actuating member 39 includes an actuating portion 391, a receiving portion 393, and a guiding portion 395. The actuating portion 391 is disposed in the sliding slot 12, and slidable in the sliding slot 12. The receiving portion 393 is disposed in the first body 10, and defines a receiving cavity 394 for receiving the transmission portion 373. The guiding portion 395 is substantially a post extending from the receiving portion 393 and corresponds to the limiting portion 151. The guiding portion 395 is slidably inserted into the limiting hole 153.

The flexible member 34 is disposed between the limiting portion 151 and the receiving portion 393, and sleeved on the guiding portion 395. In the embodiment, the flexible member 34 is a spring.

The hook member 35 is disposed on the second body 20, and corresponds to the opening 11. The hook member 35 is configured to be passed through the opening 11 and hook on the locking portion 313 and elastically supported on the supporting member 135, when the second body 20 is folded over and on the first body 10.

Figure 4:
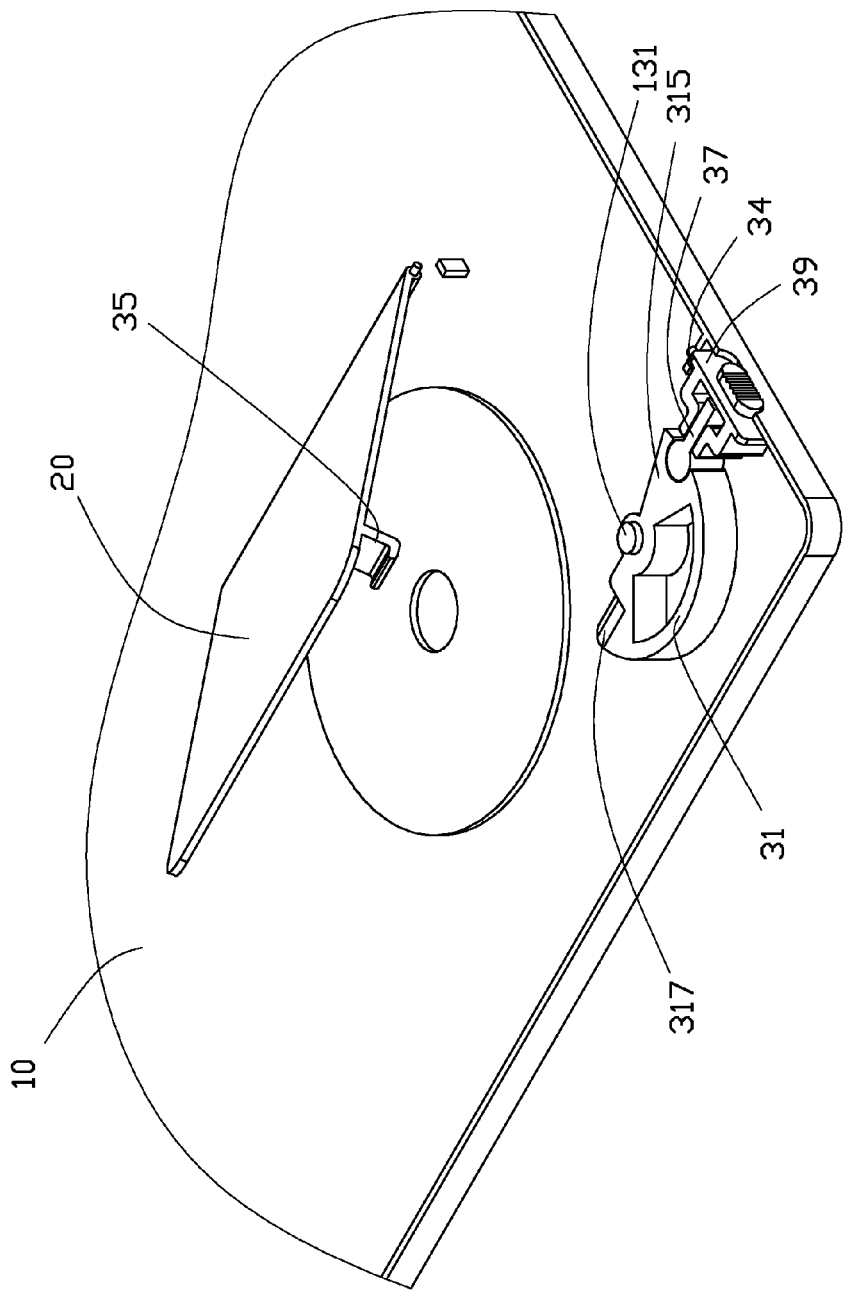
FIG. 4 is an isometric view of the electronic apparatus of FIG. 1 without an upper cover.
Figure 5:
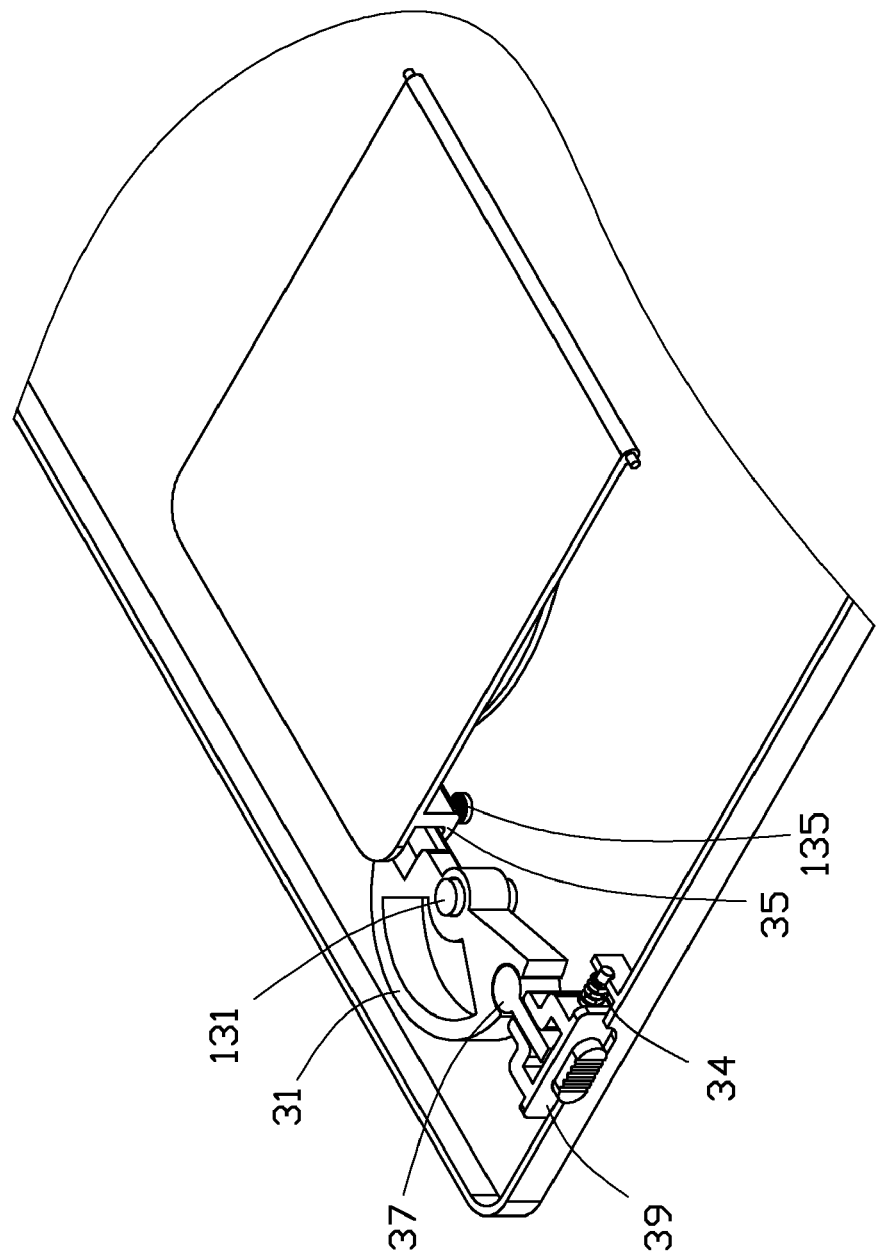
FIG. 5 is an isometric view of the electronic apparatus of FIG. 4 with a second body locked on a first body.

Referring to FIGS. 4 and 5, in assembly, firstly, the positioning post 131 is inserted into the positioning hole 311 to pivotablly position the locking member 31 on the lower cover 13. Then, the flexible member 34 is sleeved on the guiding portion 395, and the actuating portion 391 is slidably disposed in the sliding slot 12 with the guiding portion 395 inserted into the limiting hole 153. After that, the driving portion 371 is received in the receiving slot 319, and the transmission portion 373 is inserted into the receiving cavity 394. Finally, the supporting member 135 is disposed in the receiving portion 133, and the second body 20 is pivotally attached on the upper cover 14 for selectably covering the opening 11 with the hook member 35 corresponding to the locking portion 313.

When the second body 20 needs to be locked on the first body 10, the second body 20 is pressed with a rotational force with respect to the first body 10 for covering the opening 11, therefore, the hook member 35 passes through the opening 11 to contact with the inclined surface 317 of the locking portion 313 and pushes the locking member 31 to rotate around the positioning post 131. The hook member 35 continues moving down, at the same time, the transmission member 37 actuated by the driven portion 315 of the locking member 31 slides the actuating member 39 in the sliding slot 12, and the flexible member 34 becomes compressed to store a compression force. Then, the second body 20 is released, the flexible member 34 releases the compression force to drive the actuating member 39 to slide back, the transmission member 37 is driven to rotate the locking member 31 back, and the locking portion 313 becomes locked on the hook member 35, therefore, the second body 20 is locked to the first body 10.

Figure 6:
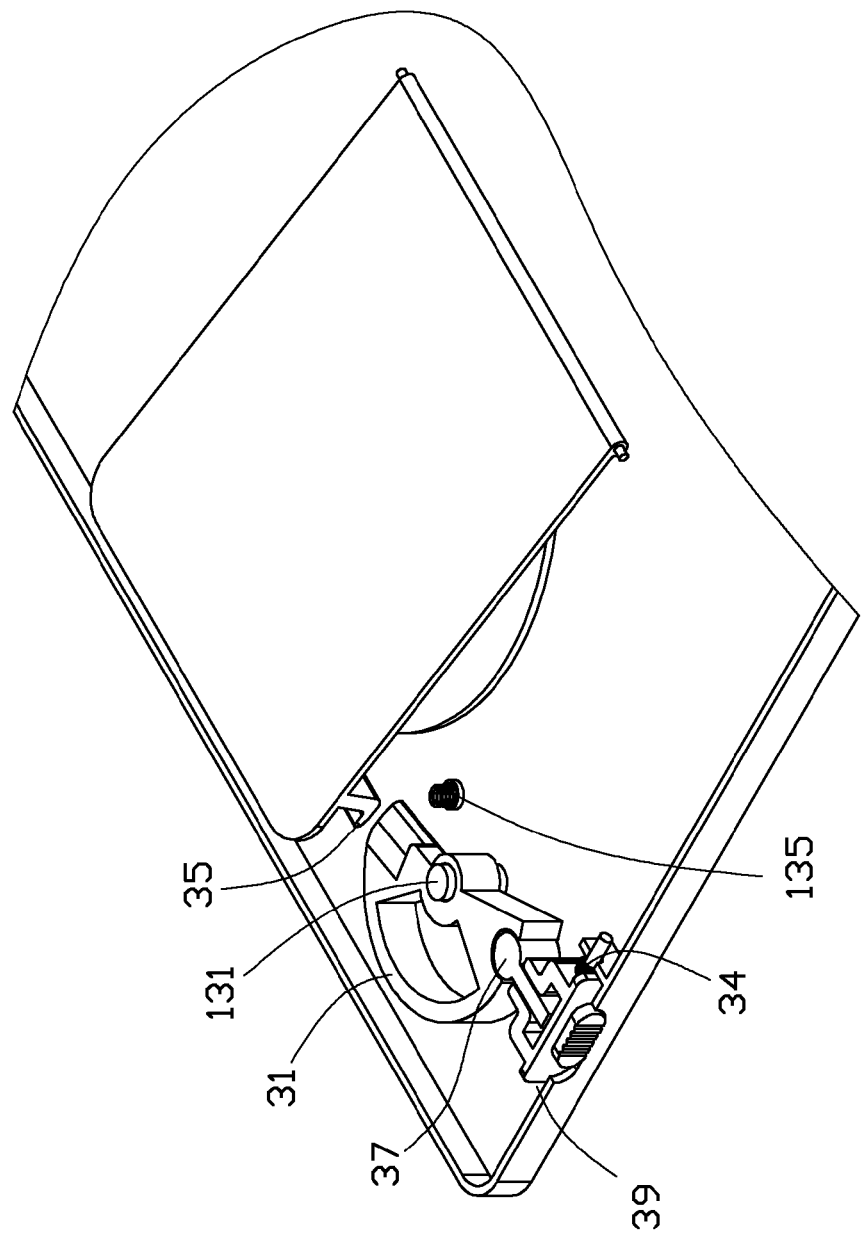
FIG. 6 is an isometric view of the electronic apparatus of FIG. 1, showing the electronic apparatus between the locked position and an unlocked position.

When the second body 20 needs to be released from the first body 10, the actuating member 39 is actuated to slide in the sliding slot 12, and the flexible member 34 becomes compressed to store a compression force, at the same time, the actuating member 39 drives the transmission member 37 to move, so as to drive the locking member 31 to rotate around the positioning post 131, therefore, the hook member 35 is released, and the second body 20 is released from the first body 10 (see FIG. 6).

The locking member 31 is capable of rotating with respect to the first body 10, when the second body 20 is pressed by the applying force, therefore, the hook member 35 does not forcibly deform, the hook member 35 is protected from damage, it is convenient to lock the second body 20 on the first body 10.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic apparatus, comprising:
   a first body;
   a second body pivotally attached on the first body for covering the first body; and
   a latching device for locking the second body on the first body when the second body covers the first body, the latching device comprising:
   a locking member rotatably attached on the first body, the locking member comprising an inclined surface;
   a hook disposed on the second body and capable of hooking on the locking member for locking the second body on the first body;
   a driving subassembly rotatably connecting with the locking member and slidably disposed on the first body; and
   a flexible member arranged between the driving subassembly and the first body to provide an elastic force to the driving subassembly;
   wherein when the second body is pressed to bring the hook to contact the inclined surface of the locking member, the hook pushes the locking member to rotate, causing the hook to move downwards and the driving subassembly to move, the flexible member is compressed by the driving subassembly; when the second body is released, the driving subassembly moves back by the elastic force of the flexible member, causing the locking member to rotate back, the locking member is locked on the hook;
   wherein when the driving subassembly is driven by the external force, the locking member rotates, causing the hook to be released from the locking member;
   wherein the transmission subassembly comprises a driving portion, the locking member defines an arc-shaped receiving slot for receiving the driving portion.

2. The electronic apparatus of claim 1, wherein the locking member comprises a locking portion, the inclined surface is defined on the locking portion, the locking portion and the receiving slot are disposed at opposite sides of a rotating axis of the locking member.

3. The electronic apparatus of claim 2, wherein the locking member is semicircle-shaped.

4. The electronic apparatus of claim 1, wherein the driving subassembly comprises a transmission member and an actuating member, the transmission member comprises the driving portion, the transmission member is disposed between the locking member and the actuating member, and the transmission member engages with the locking member and the actuating member, when the actuating member is actuated, the transmission member drives the locking member to rotate.

5. The electronic apparatus of claim 4, wherein the first body defines a sliding slot, an actuating portion of the actuating member is slidably disposed in the sliding slot.

6. The electronic apparatus of claim 5, wherein the transmission member further comprises a transmission portion connecting with the driving portion, the actuating member further comprises a receiving portion for receiving the transmission portion.

7. The electronic apparatus of claim 4, wherein the flexible member is disposed between the first body and the actuating member for driving the actuating member to move back after being de-actuated.

8. The electronic apparatus of claim 7, wherein the actuating member further comprises a post being sleeved by the flexible member.

9. A latching device for locking a first body on a second body, the latching device comprising:
   a hook disposed on the second body;
   a locking member pivotally attached on the first body to engage with the hook for locking the second body on the first body, the locking member comprising an inclined surface;
   a driving subassembly engaging with the locking member and slidably disposed on the first body; and
   a flexible member arranged between the driving subassembly and the first body to provide an elastic force to the driving subassembly;
   wherein when the second body is pressed to bring the hook to contact the inclined surface of the locking member, the hook pushes the locking member to rotate, causing the hook to move downwards and the driving subassembly to move, the flexible member is compressed by the driving subassembly; when the second body is released, the driving subassembly moves back by the elastic force of the flexible member, causing the locking member to rotate back, the locking member is locked on the hook;

wherein when the driving subassembly is driven by the external force, the locking member rotates, causing the hook to be released from the locking member;

wherein the driving subassembly comprises an actuating member slidably disposed on the first body and a transmission member engaging with the actuating member and the locking member, when the actuating member is actuated, the transmission member drives the locking member to rotate;

wherein the transmission member comprises a driving portion and a transmission portion connecting with the driving portion, the transmission portion is clipped to the actuating member, the driving portion is rotatably disposed on the locking member;

wherein the locking member defines an arc-shaped receiving slot for receiving the driving portion.

10. The latching device of claim 9, wherein the flexible member is disposed between the first body and the actuating member for driving the actuating member to move back after being de-actuated.

* * * * *